(12) United States Patent
Fu et al.

(10) Patent No.: US 12,094,469 B2
(45) Date of Patent: Sep. 17, 2024

(54) VOICE RECOGNITION METHOD AND DEVICE

(71) Applicant: JINGDONG TECHNOLOGY HOLDING CO., LTD., Beijing (CN)

(72) Inventors: Li Fu, Beijing (CN); Xiaoxiao Li, Beijing (CN)

(73) Assignee: JINGDONG TECHNOLOGY HOLDING CO., LTD., Beijing (CN)

( * ) Notice: Subject to any disclaimer, the term of this patent is extended or adjusted under 35 U.S.C. 154(b) by 441 days.

(21) Appl. No.: 17/603,690

(22) PCT Filed: Mar. 3, 2020

(86) PCT No.: PCT/CN2020/077590
§ 371 (c)(1),
(2) Date: Oct. 14, 2021

(87) PCT Pub. No.: WO2020/220824
PCT Pub. Date: Nov. 5, 2020

(65) Prior Publication Data
US 2022/0238098 A1    Jul. 28, 2022

(30) Foreign Application Priority Data
Apr. 29, 2019  (CN) .......................... 201910354527.7

(51) Int. Cl.
*G10L 15/26*     (2006.01)
*G06F 17/14*     (2006.01)
(Continued)

(52) U.S. Cl.
CPC .............. *G10L 15/26* (2013.01); *G06F 17/14* (2013.01); *G10L 15/063* (2013.01); *G10L 25/30* (2013.01)

(58) Field of Classification Search
CPC ....... G10L 25/30; G10L 15/26; G10L 15/063; G10L 15/02; G10L 15/16;
(Continued)

(56) References Cited

U.S. PATENT DOCUMENTS 5,995,934 A * 11/1999 Tang .................. G10L 15/26
704/E15.045
10,229,672 B1 * 3/2019 Rao .................. G10L 15/16
(Continued)

FOREIGN PATENT DOCUMENTS

CN    106328127 A    1/2017
CN    107016994 A    8/2017
(Continued)

OTHER PUBLICATIONS

Translation of International Search Report and Written Opinion for Application No. PCT/CN2020/077590 dated Jun. 9, 2020 (6 pages).
(Continued)

*Primary Examiner* — Abdelali Serrou
(74) *Attorney, Agent, or Firm* — Michael Best & Friedrich LLP

(57) ABSTRACT

A method for recognizing speech comprises: respectively setting initial values of a Chinese character coefficient and a Pinyin coefficient, generating a Chinese character mapping function according to the initial value of the Chinese character coefficient, and generating a Pinyin mapping function according to the initial value of the Pinyin coefficient (S101); training the Chinese character mapping function and the Pinyin mapping function using a plurality of preset training samples, calculating training results as parameters of a joint loss function, and generating a target mapping function according to calculation results (S102); and recognizing, according to the target mapping function, speech to be recognized, so as to obtain a Chinese character recogni-
(Continued)

tion result and a Pinyin recognition result of the speech to be recognized (S103). The method reduces the cost of speech recognition while ensuring the accuracy of speech recognition.

9 Claims, 7 Drawing Sheets

(51) Int. Cl.
*G10L 15/06* (2013.01)
*G10L 25/30* (2013.01)

(58) Field of Classification Search
CPC . G10L 2015/025; G10L 15/14; G10L 15/144; G10L 15/22; G10L 15/197; G10L 15/005; G10L 15/142; G10L 2015/027; G10L 25/18; G10L 15/08; G10L 15/148; G10L 2015/0638; G10L 25/51; G10L 25/78; G10L 15/10; G10L 15/18; G10L 15/183; G10L 15/187; G10L 15/28; G10L 17/00; G10L 2015/0633; G10L 2015/227; G10L 2015/228; G10L 25/24; G10L 15/04; G10L 15/07; G10L 15/1807; G10L 15/30; G10L 2015/022; G10L 2015/0631; G10L 2015/0635; G10L 2015/081; G10L 2015/088; G10L 2015/221; G10L 2021/02161; G10L 21/0216; G10L 25/03; G10L 25/87

See application file for complete search history.

(56) References Cited

U.S. PATENT DOCUMENTS

| | | | |
|---|---|---|---|
| 2014/0379335 A1* | 12/2014 | Han | G10L 15/26 704/235 |
| 2018/0247639 A1 | 8/2018 | Liu et al. | |
| 2019/0325889 A1* | 10/2019 | Li | G10L 21/0224 |
| 2019/0378497 A1* | 12/2019 | Lichun | G10L 15/063 |
| 2021/0264903 A9* | 8/2021 | Li | G10L 15/04 |

FOREIGN PATENT DOCUMENTS

| | | |
|---|---|---|
| CN | 108510983 A | 9/2018 |
| CN | 108510985 A | 9/2018 |

OTHER PUBLICATIONS

Liu et al., "Gram-CTC: Automatic Unit Selection and Target Decomposition for Sequence Labelling", arXiv, Proceedings of the 34th International Conference on Machine Learning, Aug. 2017, 10 pages.

Chan, et al., "On Online Attention-based Speech Recognition and joint Mandarin Character-Pinyin Training," Interspeech, Sep. 12, 2016 (pp. 3404-3408).

Japanese Patent Office Action for Application No. 2021561604 dated Sep. 7, 2022 (5 pages, including an English translation).

* cited by examiner

VOICE RECOGNITION METHOD AND DEVICE

CROSS-REFERENCE TO RELATED APPLICATION(S)

This is a U.S. national stage entry of International Patent Application No. PCT/CN2020/077590, filed on Mar. 3, 2020, which claims priority to Chinese Patent Application No. 201910354527.7, filed on Apr. 29, 2019, the entire contents of each of which are fully incorporated herein by reference.

TECHNICAL FIELD

The present invention relates to the field of computer technology, in particular to a method and device for recognizing speech.

BACKGROUND ART

At present, the recognition of speech using the existing Chinese character recognition method can only recognize a Chinese character recognition result, and the recognition of speech using the existing Pinyin recognition method can only recognize a Pinyin recognition result.

In the process of implementing the present invention, the inventor has found that the prior art has at least the following problems:

For the recognition of speech that contains homophones, polyphones or ambiguous pronunciation, if only the Chinese character recognition result or the Pinyin recognition result is recognized, the recognition accuracy is not high. In order to ensure the accuracy of the recognition of speech containing homophones, polyphones or ambiguous pronunciation, those skilled in the art can easily conceive of respectively using a Chinese character recognition method and a Pinyin recognition method to recognize the speech, so as to obtain a Chinese character recognition result and a Pinyin recognition result. However, the respective use of two recognition methods for the recognition of speech will cause a high recognition cost.

SUMMARY OF THE INVENTION

In view of this, embodiments of the present invention provide a method and device for recognizing speech, which can ensure the accuracy of the recognition of speech containing homophones, polyphones or ambiguous pronunciation while reducing the recognition cost.

In order to accomplish the above object, according to one aspect of the embodiments of the present invention, a method for recognizing speech is provided.

The method for recognizing speech according to the embodiments of the present invention comprises: respectively setting initial values of a Chinese character coefficient and a Pinyin coefficient, generating a Chinese character mapping function according to the initial value of the Chinese character coefficient, and generating a Pinyin mapping function according to the initial value of the Pinyin coefficient; training the Chinese character mapping function and the Pinyin mapping function using a plurality of preset training samples, calculating training results as parameters of a joint loss function, and generating a target mapping function according to calculation results; and recognizing, according to the target mapping function, speech to be recognized, so as to obtain a Chinese character recognition result and a Pinyin recognition result of the speech to be recognized.

In order to accomplish the above object, according to another aspect of the embodiments of the present invention, a device for recognizing speech is provided. The device for recognizing speech according to the embodiments of the present invention comprises: a generating unit for respectively setting initial values of a Chinese character coefficient and a Pinyin coefficient, generating a Chinese character mapping function according to the initial value of the Chinese character coefficient, and generating a Pinyin mapping function according to the initial value of the Pinyin coefficient; a processing unit for training the Chinese character mapping function and the Pinyin mapping function using a plurality of preset training samples, calculating training results as parameters of a joint loss function, and generating a target mapping function according to calculation results; and a recognition unit for recognizing, according to the target mapping function, speech to be recognized, so as to obtain a Chinese character recognition result and a Pinyin recognition result of the speech to be recognized.

In order to accomplish the above object, according to a further aspect of the embodiments of the present invention, an electronic device is provided. The electronic device according to the embodiments of the present invention comprises: one or more processors; and a storage device for storing one or more programs, which, when executed by the one or more processors, cause the one or more processors to implement the method for recognizing speech as provided by the embodiments of the present invention.

In order to accomplish the above object, according to a still further aspect of the embodiments of the present invention, a computer-readable medium is provided. The computer-readable medium according to the embodiments of the present invention has a computer program stored thereon, which, when executed by a processor, implements the method for recognizing speech as provided by the embodiments of the present invention.

An embodiment of the above invention has the following advantages or beneficial effects: generating a Chinese character mapping function according to the set initial value of the Chinese character coefficient, generating a Pinyin mapping function according to the set initial value of the Pinyin coefficient, training the Chinese character mapping function and the Pinyin mapping function using a plurality of preset training samples, calculating training results as parameters of a joint loss function, generating a target mapping function according to calculation results, and recognizing speech by the target mapping function, which can obtain both a Chinese character recognition result and a Pinyin recognition result, without sending two recognition requests, and without deploying equipment for processing the two recognition requests, can ensure the accuracy of the recognition of speech containing homophones, polyphones or ambiguous pronunciation while reducing the recognition cost, and can reduce the misunderstanding of the user's intention.

The further effects of the above-mentioned non-conventional optional modes will be described below in conjunction with specific embodiments.

BRIEF DESCRIPTION OF THE DRAWINGS

The figures are used for a better understanding of the present invention, and do not constitute improper limitations to the present invention, wherein.

DETAILED DESCRIPTION OF THE EMBODIMENTS

Figure 1:
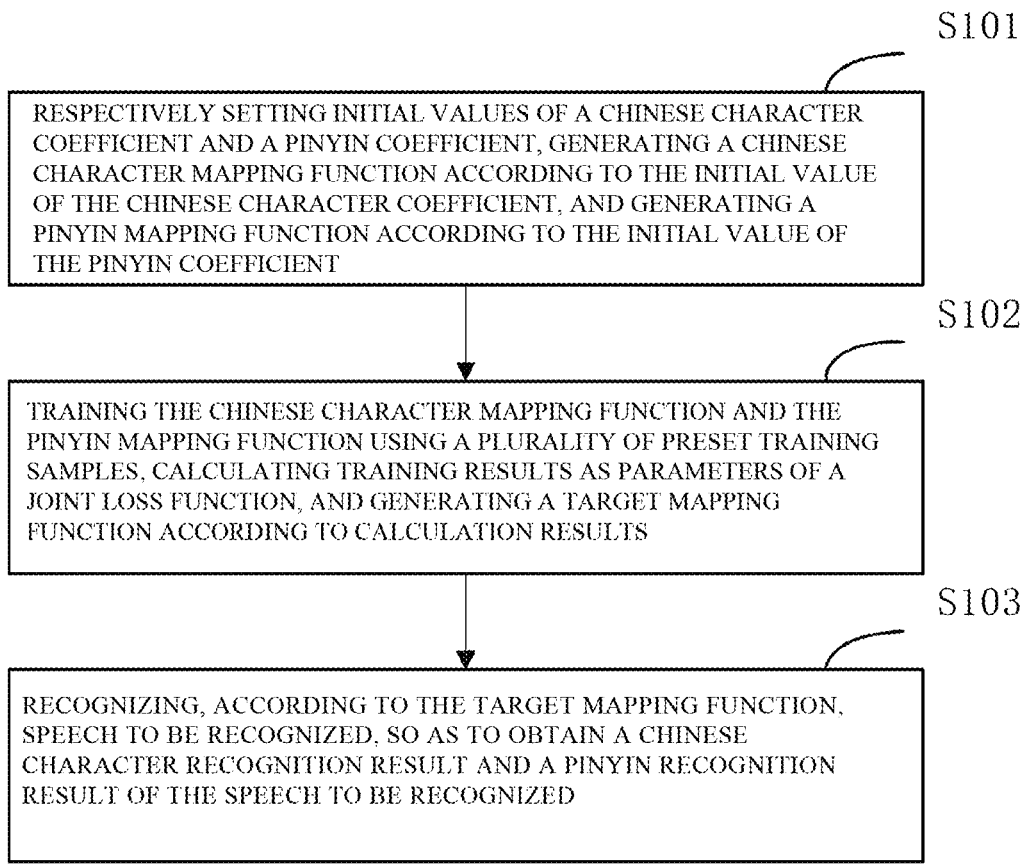
FIG. 1 is a schematic diagram of a main flow of a method for recognizing speech according to an embodiment of the present invention.

Hereinafter, the exemplary embodiments of the present invention are described with reference to the figures, wherein various details of the embodiments of the present invention are included to facilitate the understanding, and the embodiments of the present invention should be considered as only exemplary ones. Therefore, those skilled in the art should recognize that various changes and modifications may be made to the embodiments described herein without departing from the scope and spirit of the present invention. Also, descriptions of well-known functions and structures are omitted in the following description for clarity and conciseness.

It should be pointed out that, in the case of no conflict, the embodiments of the present invention and the features in the embodiments can be combined with each other.

In recent years, with the rapid development of artificial intelligence technology, the intelligent customer service system has been applied to many fields, such as e-commerce, logistics, finance or the like. Automatic speech recognition (ASR), which is one of the core technologies of the intelligent customer service system, aims to convert the user's speech into a text, understand the user's intention through the text and make a corresponding response. Therefore, the accuracy of the automatic speech recognition is very important. However, in an actual customer service conversation, the user's speech has various problems such as accent, dialect and background noise, which bring great challenges to the accurate recognition of the speech.

In order to solve the above problems, the traditional method, which adopts a Gaussian mixture model (GMM) and a hidden Markov model (HMM) to establish an acoustic model, inputs the frequency spectrum of speech to be recognized into the acoustic model to obtain a pronunciation state (the pronunciation state may be a syllable), and looks up a pronunciation dictionary according to the pronunciation state (the pronunciation dictionary stores a corresponding relationship between the pronunciation state and a recognition result) to obtain the recognition result. The traditional method is to achieve speech recognition by acquiring a pre- and post-dependent state relationship of the speech (i.e., acquiring a conditional probability distribution of each time frame of a time sequence signal).

With the rapid development of a deep learning technology, a speech recognition method based on a deep neural network (DNN) has emerged, which, compared with the traditional method, has a significant improvement in recognition performance. For example, in 2015, D. Amodei et al. proposed a Deep Speech 2 (DS2). The traditional method is to establish an acoustic model and use an output of the acoustic model as an input of the pronunciation dictionary. Therefore, the traditional method has a problem of error accumulation. Nevertheless, the DS2 is to directly establish a corresponding relationship between the frequency spectrum of the speech to be recognized and the recognition result based on the deep neural network. Therefore, the recognition accuracy of the DS2 is higher.

Both the traditional method and the DS2 can only recognize one recognition result, i.e., either a Chinese character recognition result or a Pinyin recognition result. For the recognition of speech containing homophones, polyphones or ambiguous pronunciation, if only one recognition result is recognized, the recognition accuracy is not high. The above speech involves important information such as the user's affirmation and negation or key figures, and there is also a problem of misunderstanding the user's intention, so the user experience is poor. In order to ensure the accuracy of the recognition of speech containing homophones, polyphones or ambiguous pronunciation and reduce the misunderstanding of the user's intention, the Chinese character recognition result and the Pinyin recognition result can be recognized, and the final recognition result can be determined by combining the Chinese character recognition result and the Pinyin recognition result (the process of determining the final recognition result by combining the Chinese character recognition result and the Pinyin recognition result is an existing technology). To recognize the Chinese character recognition result and the Pinyin recognition result, those skilled in the art can easily conceive of the following solution: establishing a set of models by using the existing Chinese character recognition method, then establishing a set of models by using the existing Pinyin recognition method, training the two sets of models separately, and using the two sets of trained models for recognition separately. However, the model establishment and the model training require costs. Therefore, the prior art has the problem of a high recognition cost.

In order to solve the problem in the prior art, an embodiment of the present invention provides a method for recognizing speech, which method, as shown in FIG. 1, comprises:

Step S101: respectively setting initial values of a Chinese character coefficient and a Pinyin coefficient, generating a Chinese character mapping function according to the initial value of the Chinese character coefficient, and generating a Pinyin mapping function according to the initial value of the Pinyin coefficient.

Figure 2:
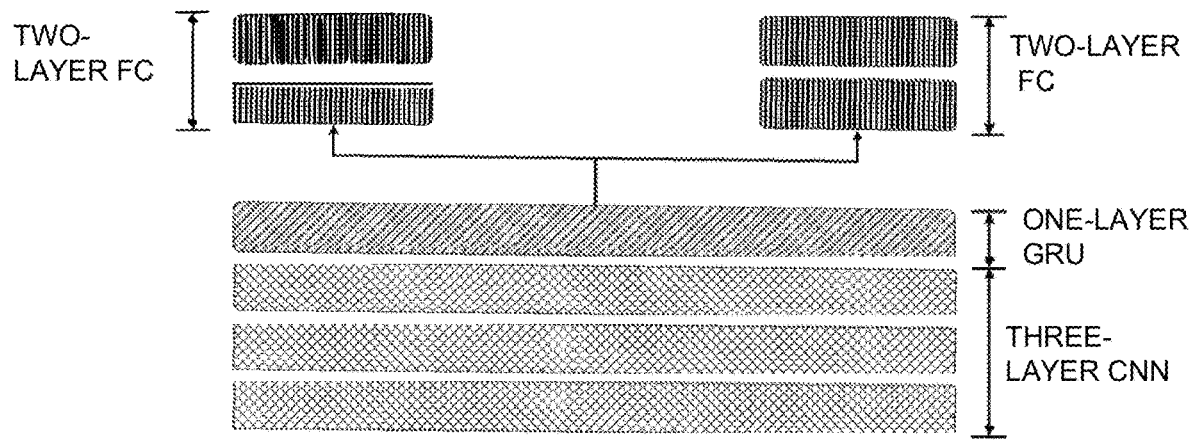
FIG. 2 is a schematic diagram of a deep neural network in the method for recognizing speech according to the embodiment of the present invention.

In this step, during specific implementation, as shown in FIG. 2, the Chinese character mapping function includes operation functions of a three-layer convolutional neural network (CNN), an operation function of a one-layer gated recurrent unit (GRU), and operation functions of a two-layer fully connected network (FC). The Pinyin mapping function also includes operation functions of the three-layer convolutional neural network, an operation function of the one-layer gated recurrent unit, and operation functions of the two-layer fully connected network. The CNN operation functions in the Chinese character mapping function are the same as those in the Pinyin mapping function, and the GRU operation function in the Chinese character mapping function is the same as that in the Pinyin mapping function, but the FC operation functions in the Chinese character mapping function are different from those in the Pinyin mapping function.

Hereinafter, a specific example is used to illustrate step S101:

$l1 = c(x, P1, O1)$
$l2 = c(l1, P2, O2)$
$l3 = c(l2, P3, O3)$ wherein $c(x, P1, O1)$ represents an operation function of the first layer of convolutional neural network, $c(l1, P2, O2)$ represents an operation function of the second layer of convolutional neural network, $c(l2, P3, O3)$ represents an operation function of the third layer of convolutional neural network, l1 represents an operation result of the first layer of convolutional neural network, l2 represents an operation result of the second layer of convolutional neural network, l3 represents an operation result of the third layer of convolutional neural network, x represents a frequency spectrum (x is an independent variable), P1 represents a convolutional kernel parameter of the first layer of convolutional neural network, P2 represents a convolutional kernel parameter of the second layer of convolutional neural network, P3 represents a convolutional kernel parameter of the third layer of convolutional neural network, O1 represents a step length parameter of the first layer of convolutional neural network, O2 represents a step length parameter of the second layer of convolutional neural network, and O3 represents a step length parameter of the third layer of convolutional neural network. For $c(x, P1, O1)$, $c(l1, P2, O2)$ and $c(l2, P3, O3)$, the operation functions of the existing convolutional neural network can be used.

$l4 = g(l3, N1, M1)$ wherein $g(l3, N1, M1)$ represents an operation function of the gated recurrent unit, l4 represents an operation result of the gated recurrent unit, N1 represents a parameter of the gated recurrent unit, and M1 represents the number of hidden layers of the gated recurrent unit. For $g(l3, N1, M1)$, the operation function of the existing gated recurrent unit can be used.

$l5\_1 = W4\_1 * l4 + b4\_1$
$l5\_2 = W4\_2 * l4 + b4\_2$ wherein $W4\_1 * l4 + b4\_1$ represents an operation function of the first layer of fully connected network of Chinese characters, $W4\_2 * l4 + b4\_2$ represents an operation function of the first layer of fully connected network of Pinyins, l5_1 represents an operation result of the first layer of fully connected network of Chinese characters, l5_2 represents an operation result of the first layer of fully connected network of Pinyins, W4_1 represents a weight matrix of the first layer of fully connected network of Chinese characters, W4_2 represents a weight matrix of the first layer of fully connected network of Pinyins, b4_1 represents a bias vector of the first layer of fully connected network of Chinese characters, and b4_2 represents a bias vector of the first layer of fully connected network of Pinyins.

$l6\_1 = W5\_1 * l5\_1 + b5\_1$
$l6\_2 = W5\_2 * l5\_2 + b5\_2$ wherein $W5\_1 * l5\_1 + b5\_1$ represents an operation function of the second layer of fully connected network of Chinese characters, $W5\_2 * l5\_2 + b5\_2$ represents an operation function of the second layer of fully connected network of Pinyins, l6_1 (l6_1 is a first dependent variable) represents an operation result of the second layer of fully connected network of Chinese characters, l6_2 (l6_2 is a second dependent variable) represents an operation result of the second layer of fully connected network of Pinyins, W5_1 represents a weight matrix of the second layer of fully connected network of Chinese characters, W5_2 represents a weight matrix of the second layer of fully connected network of Pinyins, b5_1 represents a bias vector of the second layer of fully connected network of Chinese characters, and b5_2 represents a bias vector of the second layer of fully connected network of Pinyins.

Initial values of a Chinese character coefficient (the Chinese character coefficient includes P1, O1, P2, O2, P3, O3, N1, M1, W4_1, b4_1, W5_1, and b5_1) and a Pinyin coefficient (the Pinyin coefficient includes P1, O1, P2, O2, P3, O3, N1, M1, W4_2, b4_2, W5_2, and b5_2) are set, the initial value of the Chinese character coefficient is plugged into the operation function of the second layer of fully connected network of Chinese characters, and the obtained function is used as a Chinese character mapping function; the initial value of the Pinyin coefficient is plugged into the operation function of the second layer of fully connected network of Pinyins, and the obtained function is used as a Pinyin mapping function.

Step S102: training the Chinese character mapping function and the Pinyin mapping function using a plurality of preset training samples, calculating training results as parameters of a joint loss function, and generating a target mapping function according to calculation results;

In this step, the plurality of training samples may contain 3000 types of Chinese characters and 1200 types of Pinyins. The more training samples, the more types of Chinese characters and Pinyins. For a specific implementation mode of step S102, reference may be made to the embodiment shown in FIG. 3.

Step S103: recognizing, according to the target mapping function, speech to be recognized, so as to obtain a Chinese character recognition result and a Pinyin recognition result of the speech to be recognized.

In this step, during specific implementation, a short-time Fourier transform is performed on a time domain of the speech to be recognized, so as to obtain a frequency spectrum of the speech to be recognized; the frequency spectrum of the speech to be recognized is calculated as a parameter of the target mapping function, so as to obtain a Chinese character recognition result and a Pinyin recognition result of the speech to be recognized.

In this embodiment, there are included: generating a Chinese character mapping function according to the set initial value of the Chinese character coefficient, generating a Pinyin mapping function according to the set initial value of the Pinyin coefficient, training the Chinese character mapping function and the Pinyin mapping function using a plurality of preset training samples, calculating training results as parameters of a joint loss function, generating a target mapping function according to calculation results, and recognizing speech by the target mapping function, which can obtain both a Chinese character recognition result and a Pinyin recognition result, without sending two recognition requests, and without deploying equipment for processing the two recognition requests, can ensure the accuracy of the recognition of speech containing homophones, polyphones or ambiguous pronunciation while reducing the recognition cost, and can reduce the misunderstanding of the user's intention.

Figure 3:
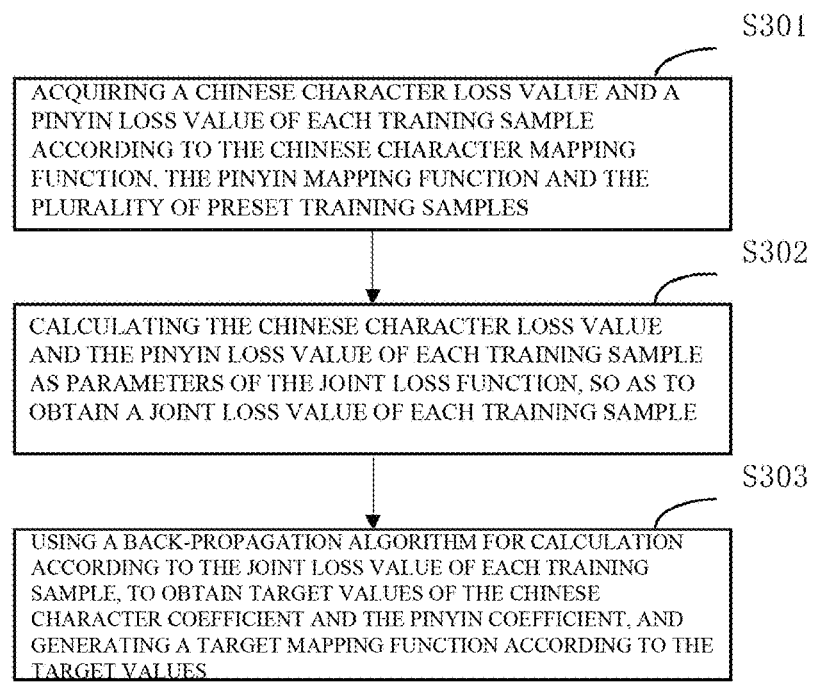
FIG. 3 is a schematic diagram of a main flow of a method for recognizing speech according to another embodiment of the present invention.

In order to solve the problem in the prior art, another embodiment of the present invention provides a method for recognizing speech. In this embodiment, on the basis of the embodiment shown in FIG. 1, as shown in FIG. 3, step S102 includes:

Step S301: acquiring a Chinese character loss value and a Pinyin loss value of each training sample according to the Chinese character mapping function, the Pinyin mapping function and the plurality of preset training samples.

Figure 4:
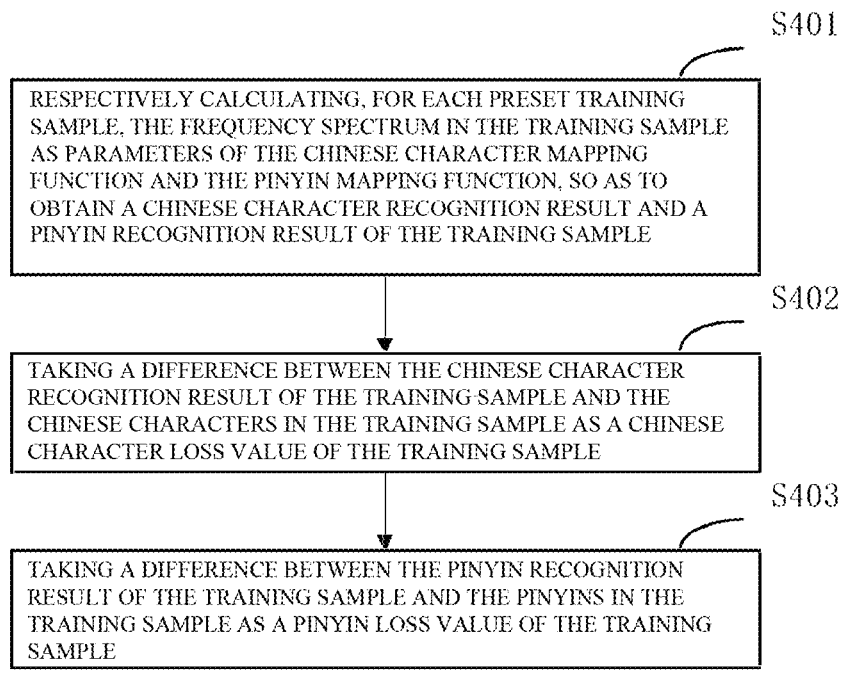
FIG. 4 is a schematic diagram of a main flow of calculating a Chinese character loss value and a Pinyin loss value in the method for recognizing speech according to the another embodiment of the present invention.

In this step, for a specific implementation mode of step S301, reference may be made to the embodiment shown in FIG. 4.

Step 302: calculating the Chinese character loss value and the Pinyin loss value of each training sample as parameters of the joint loss function, so as to obtain a joint loss value of each training sample.

In this step, the joint loss function is similar to the existing connectionist temporal classification (CTC) loss function. They differ in that: the parameters of the joint loss function include the Chinese character loss value and the Pinyin loss value, while the parameter of the existing connectionist temporal classification loss function includes only the Chinese character loss value or only the Pinyin loss value. For a specific implementation mode of step S302, reference may be made to the embodiment shown in FIG. 5.

Step S303: using a back-propagation algorithm for calculation according to the joint loss value of each training sample, to obtain target values of the Chinese character coefficient and the Pinyin coefficient, and generating a target mapping function according to the target values.

In this step, during specific implementation, an adaptive moment estimation method (ADAM) is used for calculation according to the joint loss value of each training sample, to obtain a target value of the Chinese character coefficient and a target value of the Pinyin coefficient. The adaptive moment estimation method is a first-order optimization algorithm that can replace the traditional stochastic gradient descent process.

It should be understood that the initial values of the Chinese character coefficient and the Pinyin coefficient are set arbitrarily, and the target value of the Chinese character coefficient and the target value of the Pinyin coefficient can only be obtained through the training of a plurality of training samples, the calculation of a joint loss function, and the calculation of a back-propagation algorithm.

On the basis of the example in step S101, a specific example is used to illustrate the generation of a target mapping function according to the target values: plugging the target value of the Chinese character coefficient into the operation function of the second layer of fully connected network of Chinese characters, wherein the obtained function is used as a target Chinese character mapping function, and plugging the target value of the Pinyin coefficient into the operation function of the second layer of fully connected network of Pinyins, wherein the obtained function is used as a target Pinyin mapping function, the target mapping function including the target Chinese character mapping function and the target Pinyin mapping function.

In this embodiment, there are included: acquiring a Chinese character loss value and a Pinyin loss value of each training sample according to the Chinese character mapping function, the Pinyin mapping function and the plurality of preset training samples; calculating the Chinese character loss value and the Pinyin loss value of each training sample as parameters of the joint loss function, so as to obtain a joint loss value of each training sample; and using a back-propagation algorithm for calculation according to the joint loss value of each training sample, to obtain target values of the Chinese character coefficient and the Pinyin coefficient, and generating a target mapping function according to the target values, thereby recognizing both a Chinese character recognition result and a Pinyin recognition result, without sending two recognition requests, and without deploying equipment for processing the two recognition requests, further ensuring the accuracy of the recognition of speech containing homophones, polyphones or ambiguous pronunciation while reducing the recognition cost, and reducing the misunderstanding of the user's intention.

In the embodiments of the present invention, as shown in FIG. 4, the training sample includes a frequency spectrum of sample speech, Chinese characters matching the sample speech, and Pinyins matching the sample speech; step S301 comprises:

Step S401: respectively calculating, for each preset training sample, the frequency spectrum in the training sample as parameters of the Chinese character mapping function and the Pinyin mapping function, so as to obtain a Chinese character recognition result and a Pinyin recognition result of the training sample.

In this step, the training sample can be obtained in the following way: performing a short-time Fourier transform on a time domain of sample speech to obtain a frequency spectrum of the sample speech; manually labeling Chinese characters matching the sample speech (after manually labeling the Chinese characters matching the sample speech, they need to be screened, and should be corrected in time if they are found to be incorrect) and Pinyins matching the sample speech (the Pinyins matching the sample speech can also be obtained by converting the Chinese characters matching the sample speech with an open source tool for converting Chinese characters to Pinyins). Certainly, only one training sample can be obtained by using a piece of sample speech.

Hereinafter, a specific example is used to illustrate the training sample with the following expression:

$$S_i = \{x_i, y_i^h, y_i^p\}$$

wherein $i \in [1, s]$, s represents the number of training samples, $x_i$ represents a frequency spectrum of the sample speech, $y_i^h$ represents Chinese characters matching the sample speech, and $y_i^p$ represents Pinyins matching the sample speech.

It should be understood that the more scenarios involved in the sample speech and the greater the number of training samples, the better the robustness of the method for recognizing speech as provided by the embodiments of the present invention. Certainly, the sample speech may be speech in the financial customer service scenario, the total duration of all sample speech may be 5000 hours, which may include Chinese characters, numbers or letters, and the sampling rate of the sample speech may be 8 kHz.

Note that: there is a gap between the Chinese character recognition result of the training sample and the Chinese characters in the training sample. Likewise, there is a gap between the Pinyin recognition result of the training sample and the Pinyins in the training sample. The embodiments of the present invention aim to make the two gaps as small as possible to obtain target values of the Chinese character coefficient and the Pinyin coefficient, so as to obtain a target mapping function.

On the basis of the example in step S101, a specific example is used to illustrate this step: the frequency spectrum in the Chinese character mapping function is an independent variable, and the frequency spectrum in the training sample is calculated as the independent variable of the Chinese character mapping function to obtain a Chinese character recognition result of the training sample (i.e., 16_1); likewise, the frequency spectrum in the Pinyin mapping function is also an independent variable, and the frequency spectrum in the training sample is calculated as the independent variable of the Pinyin mapping function to obtain a Pinyin recognition result of the training sample (i.e., 16_2).

Step S402: taking a difference between the Chinese character recognition result of the training sample and the Chinese characters in the training sample as a Chinese character loss value of the training sample.

In this step, the Chinese characters in the training sample are Chinese characters matching the sample speech as included in the training sample.

Step S403: taking a difference between the Pinyin recognition result of the training sample and the Pinyins in the training sample as a Pinyin loss value of the training sample.

In this step, the Pinyins in the training sample are Pinyins matching the sample speech as included in the training sample.

In this embodiment, there are included: respectively calculating, for each preset training sample, the frequency spectrum in the training sample as parameters of the Chinese character mapping function and the Pinyin mapping function, so as to obtain a Chinese character recognition result and a Pinyin recognition result of the training sample; taking a difference between the Chinese character recognition result of the training sample and the Chinese characters in the training sample as a Chinese character loss value of the training sample; and taking a difference between the Pinyin recognition result of the training sample and the Pinyins in the training sample as a Pinyin loss value of the training sample. The target mapping function is obtained from the Chinese character loss value and the Pinyin loss value of the training sample, thereby recognizing both a Chinese character recognition result and a Pinyin recognition result, without sending two recognition requests, and without deploying equipment for processing the two recognition requests, further ensuring the accuracy of the recognition of speech containing homophones, polyphones or ambiguous pronunciation while reducing the recognition cost, and reducing the misunderstanding of the user's intention.

Figure 5:
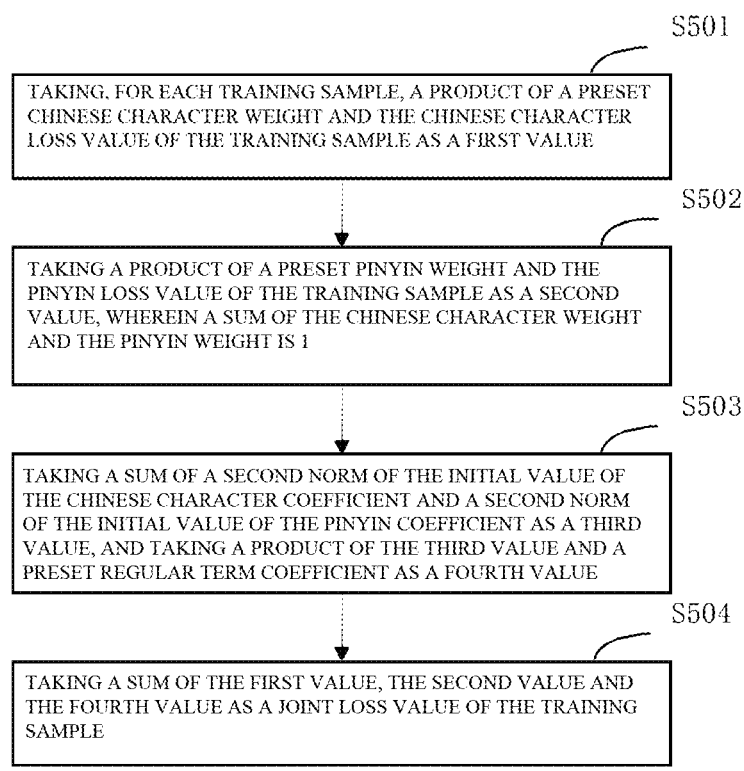
FIG. 5 is a schematic diagram of a main flow of calculating a joint loss value in the method for recognizing speech according to the another embodiment of the present invention.

In the embodiments of the present invention, as shown in FIG. 5, step S302 comprises:

Step S501: taking, for each training sample, a product of a preset Chinese character weight and the Chinese character loss value of the training sample as a first value.

In this step, the Chinese character weight has a value range of [0,1].

Step S502: taking a product of a preset Pinyin weight and the Pinyin loss value of the training sample as a second value, wherein a sum of the Chinese character weight and the Pinyin weight is 1.

In this step, the Pinyin weight has a value range of [0,1]. The purpose of the target mapping function can be changed by changing the Chinese character weight and the Pinyin weight. For example, if the Chinese character weight is 0 and the Pinyin weight is 1, only the Pinyin recognition result can be recognized according to the target mapping function; if the Chinese character weight is 1 and the Pinyin weight is 0, only the Chinese character recognition result can be recognized according to the target mapping function; if the Chinese character weight is 0.5 and the Pinyin weight is 0.5, both the Pinyin recognition result and the Chinese character recognition result can be recognized according to the target mapping function.

Figure 6:
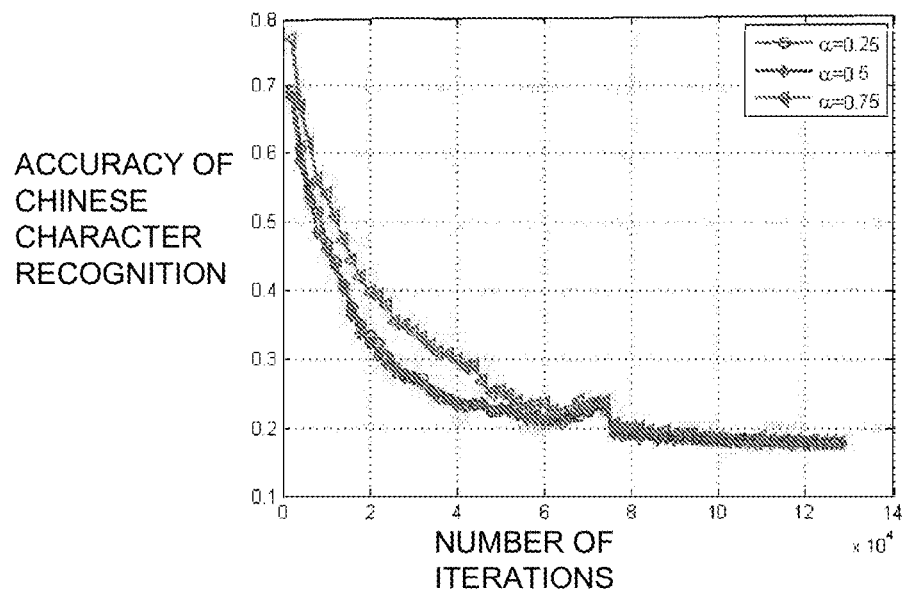
FIG. 6 is a schematic diagram of the accuracy of Chinese character recognition in the method for recognizing speech according to the another embodiment of the present invention.
Figure 7:
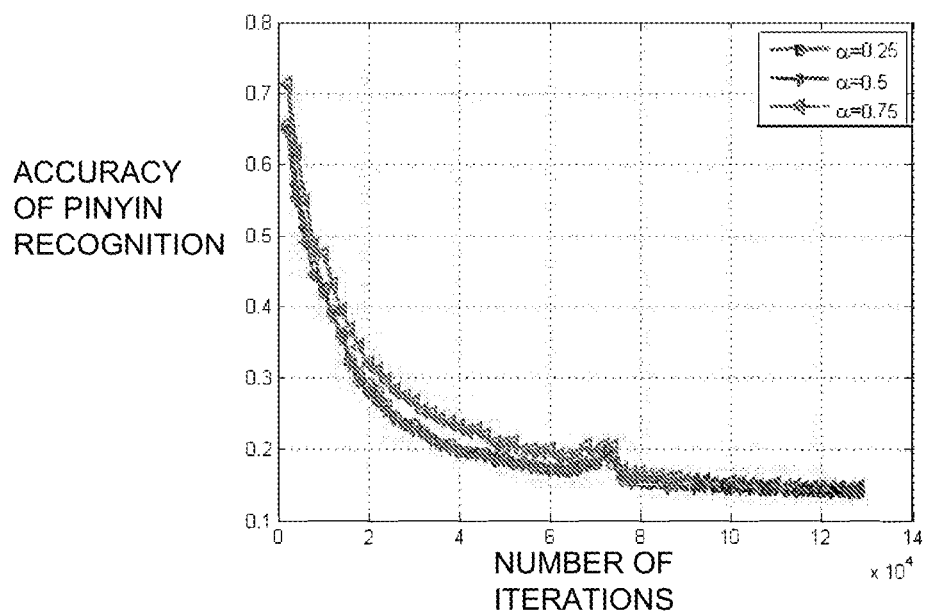
FIG. 7 is a schematic diagram of the accuracy of Pinyin recognition in the method for recognizing speech according to the another embodiment of the present invention.
Figure 8:
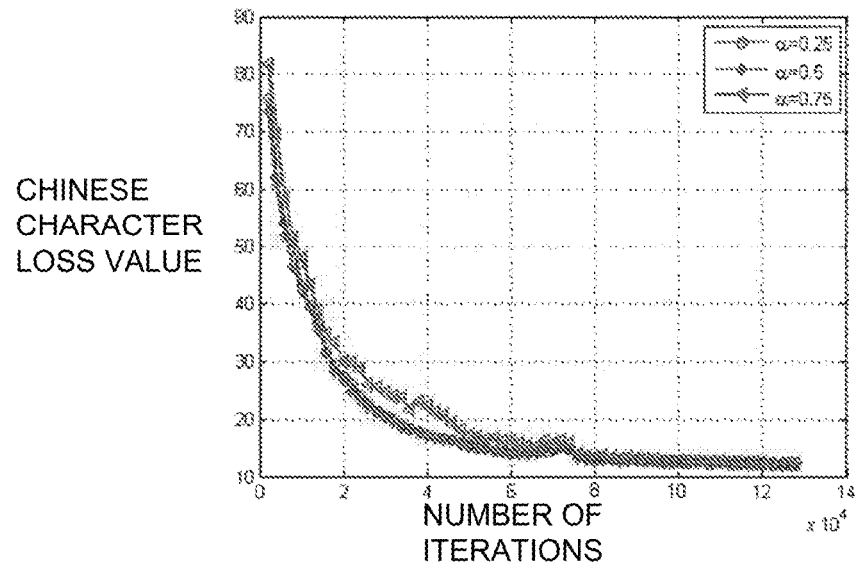
FIG. 8 is a schematic diagram of the Chinese character loss value in the method for recognizing speech according to the another embodiment of the present invention.
Figure 9:
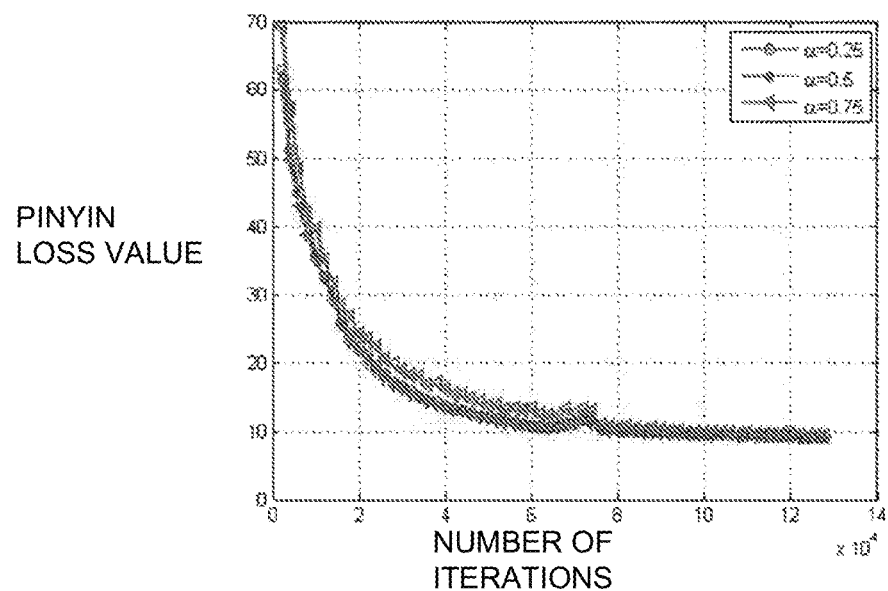
FIG. 9 is a schematic diagram of the Pinyin loss value in the method for recognizing speech according to the another embodiment of the present invention.

The Chinese character weights are respectively taken as 0.25, 0.5 and 0.75, and the corresponding Pinyin weights are respectively taken as 0.75, 0.5 and 0.25 to obtain an accuracy of Chinese character recognition, an accuracy of Pinyin recognition, a Chinese character loss value and a Pinyin loss value. The accuracy of Chinese character recognition is shown in FIG. 6, and the accuracy of Pinyin recognition is shown in FIG. 7. It can be seen from FIG. 6 and FIG. 7 that the target mapping function can effectively and quickly converge, and the accuracy of Chinese character recognition and the accuracy of Pinyin recognition are both greater than 80%, wherein the accuracy of Chinese character recognition converges to 83%, and the accuracy of Pinyin recognition converges to 87%. The Chinese character loss value is shown in FIG. 8, and the Pinyin loss value is shown in FIG. 9. It can be seen from FIG. 8 and FIG. 9 that the Chinese character loss value converges to 12.3, and the Pinyin loss value converges to 9.3. As can be seen, the accuracy of Pinyin recognition is better than the accuracy of Chinese character recognition. This is because there are 3000 types of Chinese characters and 1200 types of Pinyins, that is, the types of Chinese characters are more than those of Pinyins. Meanwhile, as can be seen from FIGS. 6-9, for the joint loss value, the value of the Chinese character weight has a great impact on the convergence rate; if the value of the Chinese character weight is small, the convergence rate is slow, but the impact on the final convergence result is small. Therefore, the most appropriate value for the Chinese character weight is 0.5, which balances the Chinese character loss value and the Pinyin loss value.

Step S503: taking a sum of a second norm of the initial value of the Chinese character coefficient and a second norm of the initial value of the Pinyin coefficient as a third value, and taking a product of the third value and a preset regular term coefficient as a fourth value.

In this step, during specific implementation, the regular term coefficient may be set to $10^{-5}$. The function of the regular term coefficient is to suppress the Chinese character coefficient and the Pinyin coefficient so as to prevent the target mapping function from failing to converge because the Chinese character coefficient and the Pinyin coefficient are too large.

Step S504: taking a sum of the first value, the second value and the fourth value as a joint loss value of the training sample.

Hereinafter, a specific example is used to illustrate this embodiment:

The joint loss function has the following expression:

$$L = \alpha L_h + (1-\alpha)L_p + \beta \sum_k \|w_k\|$$

wherein L represents a joint loss value of the training sample, α represents a Chinese character weight, (1−α) represents a Pinyin weight, β represents a regular term coefficient, $L_h$ represents a Chinese character loss value of the training sample, $L_p$ represents a Pinyin loss value of the training sample, and $w_k$ represents an initial value of the Chinese character coefficient and an initial value of the Pinyin coefficient.

The Chinese character weight is set to 0.5, the Pinyin weight is set to 0.5, and the regular term coefficient is set to $10^{-5}$.

For each training sample, the Chinese character loss value of the training sample, the Pinyin loss value of the training sample, the Chinese character weight (0.5), the Pinyin weight (0.5), the regular term coefficient ($10^{-5}$), and the preset initial values of the Chinese character coefficient and the Pinyin coefficient are plugged into the expression of the joint loss function for calculation to obtain a joint loss value of the training sample.

In this embodiment, there are included: taking, for each training sample, a product of a preset Chinese character weight and the Chinese character loss value of the training sample as a first value; taking a product of a preset Pinyin weight and the Pinyin loss value of the training sample as a second value, wherein a sum of the Chinese character weight and the Pinyin weight is 1; taking a sum of a second norm of the initial value of the Chinese character coefficient and a second norm of the initial value of the Pinyin coefficient as a third value, and taking a product of the third value and a preset regular term coefficient as a fourth value; and taking a sum of the first value, the second value and the fourth value as a joint loss value of the training sample. The target mapping function is obtained from the joint loss value of the training sample, thereby recognizing both a Chinese character recognition result and a Pinyin recognition result, without sending two recognition requests, and without deploying equipment for processing the two recognition requests, further ensuring the accuracy of the recognition of speech containing homophones, polyphones or ambiguous pronunciation while reducing the recognition cost, and reducing the misunderstanding of the user's intention.

In the embodiments of the present invention, step S103 comprises:

performing a short-time Fourier transform on a time domain of the speech to be recognized, so as to obtain a frequency spectrum of the speech to be recognized.

The frequency spectrum of the speech to be recognized is calculated as a parameter of the target mapping function, so as to obtain a Chinese character recognition result and a Pinyin recognition result of the speech to be recognized.

In this embodiment, on the basis of the example in step S303, a specific example is used to illustrate that the frequency spectrum of the speech to be recognized is calculated as a parameter of the target mapping function, so as to obtain a Chinese character recognition result and a Pinyin recognition result of the speech to be recognized; the frequency spectrum in the target Chinese character mapping function is an independent variable, the frequency spectrum in the target Pinyin mapping function is an independent variable, and the frequency spectrum of the speech to be recognized is respectively calculated as the independent variables of the target Chinese character mapping function and the target Pinyin mapping function to obtain a Chinese character recognition result (i.e., 16_1) and a Pinyin recognition result (i.e., 16_2) of the speech to be recognized.

The short-time Fourier transform (STFT) has a window size of 20 ms and a window step length of 10 ms. Therefore, the obtained frequency spectrum of the speech to be recognized is an 81-dimensional frequency spectrum information sequence. The short-time Fourier transform is a Fourier transform method for determining the frequency and phase of a sine wave in a local area of a time-varying signal.

In this embodiment, there are included: performing a short-time Fourier transform on a time domain of the speech to be recognized, so as to obtain a frequency spectrum of the speech to be recognized, and calculating the frequency spectrum of the speech to be recognized as a parameter of the target mapping function, so as to obtain a Chinese character recognition result and a Pinyin recognition result of the speech to be recognized, which, without sending two recognition requests, and without deploying equipment for processing the two recognition requests, further ensure the accuracy of the recognition of speech containing homophones, polyphones or ambiguous pronunciation while reducing the recognition cost.

It should be understood that the embodiments of the present invention combine the model used by the Chinese character recognition method and the model used by the Pinyin recognition method into one, and simultaneously perform Chinese character recognition training and Pinyin recognition training on the two-in-one model to obtain a target mapping function that can recognize both the Chinese character recognition result and the Pinyin recognition result, so as to reduce the recognition cost.

The method for recognizing speech is described above in conjunction with FIGS. 1 to 9, and the device for recognizing speech is described below in conjunction with FIG. 10.

Figure 10:
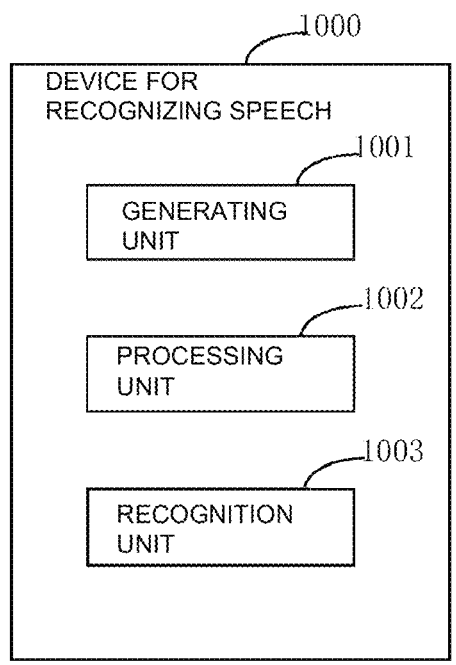
FIG. 10 is a schematic diagram of main units of a device for recognizing speech according to an embodiment of the present invention.

In order to solve the problem in the prior art, an embodiment of the present invention provides a device for recognizing speech, which device, as shown in FIG. 10, comprises:

a generating unit 1001 for respectively setting initial values of a Chinese character coefficient and a Pinyin coefficient, generating a Chinese character mapping function according to the initial value of the Chinese character coefficient, and generating a Pinyin mapping function according to the initial value of the Pinyin coefficient;

a processing unit 1002 for training the Chinese character mapping function and the Pinyin mapping function using a plurality of preset training samples, calculating training results as parameters of a joint loss function, and generating a target mapping function according to calculation results; and a recognition unit 1003 for recognizing, according to the target mapping function, speech to be recognized, so as to obtain a Chinese character recognition result and a Pinyin recognition result of the speech to be recognized.

In the embodiment of the present invention, the processing unit 1002 is used for:

acquiring a Chinese character loss value and a Pinyin loss value of each training sample according to the Chinese character mapping function, the Pinyin mapping function and the plurality of preset training samples;

calculating the Chinese character loss value and the Pinyin loss value of each training sample as parameters of the joint loss function, so as to obtain a joint loss value of each training sample; and using a back-propagation algorithm for calculation according to the joint loss value of each training sample, to obtain target values of the Chinese character coefficient and the Pinyin coefficient, and generating a target mapping function according to the target values.

In the embodiment of the present invention, the training sample includes a frequency spectrum of sample speech, Chinese characters matching the sample speech, and Pinyins matching the sample speech; and the processing unit 1002 is used for:

respectively calculating, for each preset training sample, the frequency spectrum in the training sample as parameters of the Chinese character mapping function and the Pinyin mapping function, so as to obtain a Chinese character recognition result and a Pinyin recognition result of the training sample;

taking a difference between the Chinese character recognition result of the training sample and the Chinese characters in the training sample as a Chinese character loss value of the training sample; and taking a difference between the Pinyin recognition result of the training sample and the Pinyins in the training sample as a Pinyin loss value of the training sample.

In the embodiment of the present invention, the processing unit 1002 is used for:

taking, for each training sample, a product of a preset Chinese character weight and the Chinese character loss value of the training sample as a first value;

taking a product of a preset Pinyin weight and the Pinyin loss value of the training sample as a second value, wherein a sum of the Chinese character weight and the Pinyin weight is 1;

taking a sum of a second norm of the initial value of the Chinese character coefficient and a second norm of the initial value of the Pinyin coefficient as a third value, and taking a product of the third value and a preset regular term coefficient as a fourth value; and taking a sum of the first value, the second value and the fourth value as a joint loss value of the training sample.

In the embodiment of the present invention, the recognition unit 1003 is used for:

performing a short-time Fourier transform on a time domain of the speech to be recognized, so as to obtain a frequency spectrum of the speech to be recognized; and calculating the frequency spectrum of the speech to be recognized as a parameter of the target mapping function, so as to obtain a Chinese character recognition result and a Pinyin recognition result of the speech to be recognized.

It should be understood that the functions performed by various components of the device for recognizing speech as provided by the embodiment of the present invention have been described in detail in the method for recognizing speech according to the foregoing embodiments, and thus will be no longer repeated here.

Figure 11:
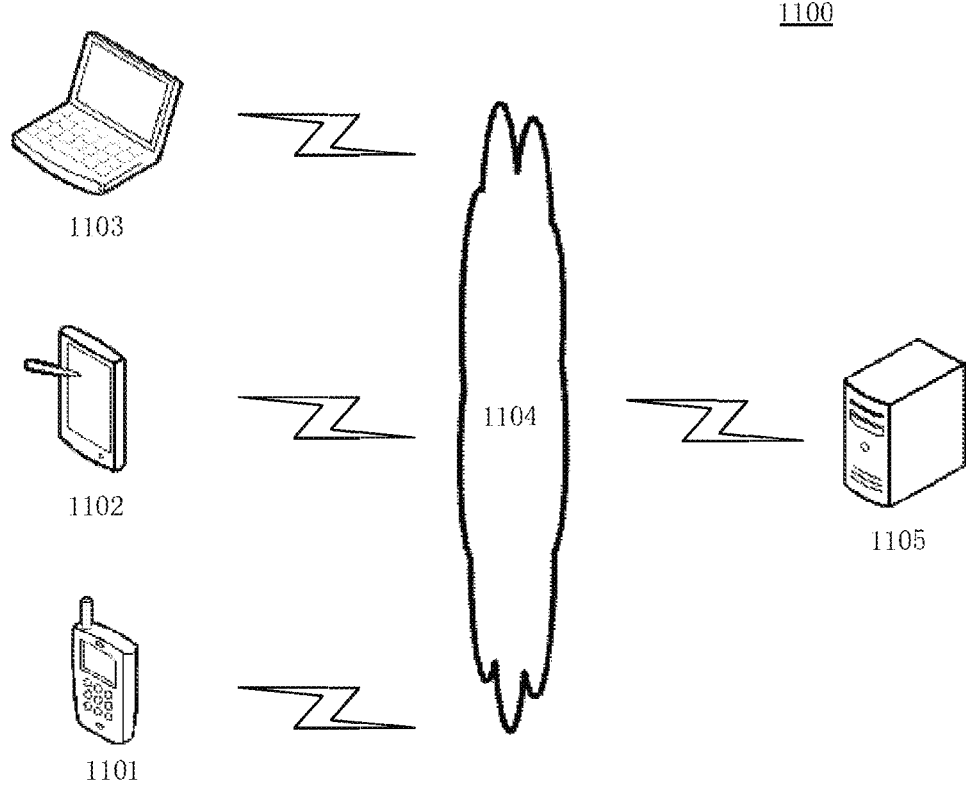
FIG. 11 is an exemplary system architecture diagram to which the embodiments of the present invention can be applied.

FIG. 11 shows an exemplary system architecture 1100 to which the method for recognizing speech or the device for recognizing speech according to the embodiments of the present invention can be applied;

As shown in FIG. 11, the system architecture 1100 may include terminal devices 1101, 1102, 1103, a network 1104, and a server 1105. The network 1104 is used to provide a communication link medium between the terminal devices 1101, 1102, 1103 and the server 1105. The network 1104 may include various connection types, such as wired and wireless communication links, fiber optic cables, etc.

The user can use the terminal devices 1101, 1102, 1103 to interact with the server 1105 via the network 1104 to receive or send messages, etc.

The terminal devices 1101, 1102, 1103 may be various electronic devices that have a display screen and support web browsing, including but not limited to smart phones, tablet computers, laptop computers, desktop computers, and so on.

The server 1105 may be a server that provides various services, for example, a back-end management server (which is just an example) that provides support for shopping websites browsed by users using the terminal devices 1101, 1102, 1103. The back-end management server can subject the received data such as a product information query request to processing such as analysis, and feed the processing results (such as target push information and product information, which are only examples) back to the terminal devices.

Note that: the method for recognizing speech as provided by the embodiments of the present invention is generally executed by the server 1105. Accordingly, the device for recognizing speech is generally provided in the server 1105.

It should be understood that the numbers of the terminal device, the network and the server in FIG. 11 are only illustrative. According to implementation needs, there may be any numbers of the terminal device, the network and the server.

Figure 12:
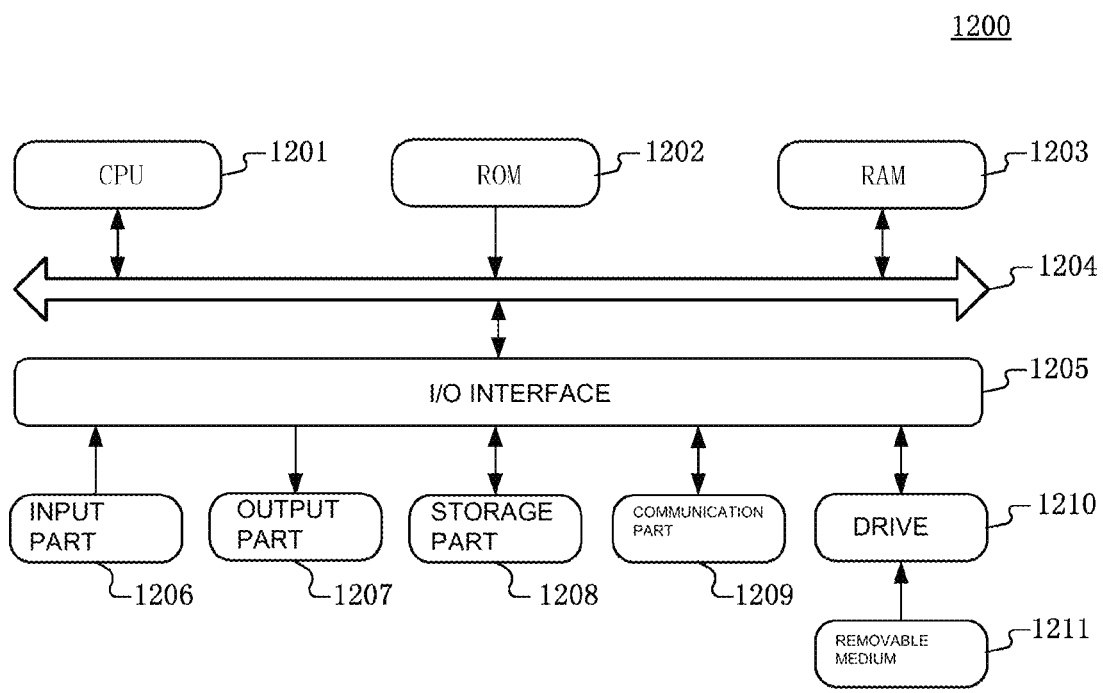
FIG. 12 is a structural schematic diagram of a computer system suitable for implementing a terminal device or a server according to an embodiment of the present invention.

Referring now to FIG. 12, it shows a structural schematic diagram of a computer system 1200 suitable for implementing a terminal device according to an embodiment of the present invention. The terminal device shown in FIG. 12, which is only an example, should not bring any limitation to the function and use scope of the embodiment of the present invention.

As shown in FIG. 12, the computer system 1200 includes a central processing unit (CPU) 1201, which can perform various appropriate actions and processes according to a program stored in a read-only memory (ROM) 1202 or a program loaded from a storage part 1208 into a random access memory (RAM) 1203. Various programs and data required for the operation of the system 1200 are also stored in the RAM 1203. The CPU 1201, the ROM 1202, and the RAM 1203 are connected to each other through a bus 1204. An input/output (I/O) interface 1205 is also connected to the bus 1204.

The following components are connected to the I/O interface 1205: an input part 1206 including a keyboard, a mouse and the like; an output part 1207 including a cathode ray tube (CRT), a liquid crystal display (LCD), a speaker and the like; a storage part 1208 including a hard disk and the like; and a communication part 1209 including a network interface card such as a LAN card, a modem and the like. The communication part 1209 performs communication processing via a network such as the Internet. A drive 1210 is also connected to the I/O interface 1205 as required. A removable medium 1211, such as a magnetic disk, an optical disk, a magneto-optical disk, a semiconductor memory or the like, is installed on the drive 1210 as required, so that the computer program read from it is installed into the storage part 1208 as required.

In particular, according to the embodiment disclosed in the present invention, the process described above with reference to the flowchart can be implemented as a computer software program. For example, the embodiment disclosed in the present invention includes a computer program product, which includes a computer program carried on a computer-readable medium, and the computer program contains a program code for executing the method shown in the flowchart. In such an embodiment, the computer program may be downloaded and installed from the network through the communication part 1209, and/or installed from the removable medium 1211. When the computer program is executed by the central processing unit (CPU) 1201, the above-mentioned functions defined in the system of the present invention are executed.

Note that: the computer-readable medium shown in the present invention may be a computer-readable signal medium or a computer-readable storage medium, or any combination of the above two. The computer-readable storage medium may be, for example, but not limited to, an electrical, magnetic, optical, electromagnetic, infrared or semiconductor system, device or device, or a combination of any of the above. More specific examples of the computer-readable storage medium may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present invention, the computer-readable storage medium may be any tangible medium that contains or stores a program, and the program may be used by or in combination with an instruction execution system, apparatus or device. Moreover, in the present invention, the computer-readable signal medium may include a data signal propagated in baseband or as a part of a carrier wave, in which a computer-readable program code is carried. The propagated data signal can take many forms, including but not limited to an electromagnetic signal, an optical signal, or any suitable combination of the above. The computer-readable signal medium may also be any computer-readable medium other than the computer-readable storage medium, and the computer-readable medium can send, propagate, or transmit a program used by or in combination with an instruction execution system, apparatus or device. The program code contained on the computer-readable medium can be transmitted by any suitable medium, including but not limited to: wireless, wire, optical cable, RF and the like, or any suitable combination of the above.

The flowcharts and block diagrams in the drawings illustrate possible system architectures, functions and operations of the system, method and computer program product according to various embodiments of the present invention. In this regard, each block in the flowcharts or block diagrams can represent a unit, a program segment or a part of a code, which contains one or more executable instructions for realizing the specified logic function. It should also be noted that, in some alternative implementations, the functions marked in the blocks may also occur in a different order from that marked in the drawings. For example, two blocks shown in succession can actually be executed substantially in parallel, and they can sometimes be executed in a reverse order, depending on the functions involved. It should further be noted that each block in the block diagrams or flowcharts, and the combination of blocks in the block diagrams or flowcharts can be implemented by a dedicated hardware-based system that performs the specified functions or operations, or can be implemented by a combination of dedicated hardware and computer instructions.

The units involved in the embodiments described in the present invention can be implemented by software or hardware. The described units can also be provided in a processor, which, for example, can be described as: a processor including a generating unit, a processing unit, and a recognition unit. Herein, the names of these units do not constitute limitations to the units themselves under certain circumstances. For example, the recognition unit can also be described as "recognizing, according to the target mapping function, speech to be recognized, so as to obtain a Chinese character recognition result and a Pinyin recognition result of the speech to be recognized".

As another aspect, the present invention also provides a computer-readable medium, which may be included in the device described in the above embodiment or may exist alone without being assembled into the device. The above computer-readable medium carries one or more programs that, when executed by a device, cause the device to include: respectively setting initial values of a Chinese character coefficient and a Pinyin coefficient, generating a Chinese character mapping function according to the initial value of the Chinese character coefficient, and generating a Pinyin mapping function according to the initial value of the Pinyin coefficient; training the Chinese character mapping function and the Pinyin mapping function using a plurality of preset training samples, calculating training results as parameters of a joint loss function, and generating a target mapping function according to calculation results; and recognizing, according to the target mapping function, speech to be recognized, so as to obtain a Chinese character recognition result and a Pinyin recognition result of the speech to be recognized.

The technical solutions according to the embodiments of the present invention comprise: generating a Chinese character mapping function according to the set initial value of the Chinese character coefficient, generating a Pinyin mapping function according to the set initial value of the Pinyin coefficient, training the Chinese character mapping function and the Pinyin mapping function using a plurality of preset training samples, calculating training results as parameters of a joint loss function, generating a target mapping function according to calculation results, and recognizing speech by the target mapping function, which can obtain both a Chinese character recognition result and a Pinyin recognition result, without sending two recognition requests, and without deploying equipment for processing the two recognition requests, can ensure the accuracy of the recognition of speech containing homophones, polyphones or ambiguous pronunciation while reducing the recognition cost, and can reduce the misunderstanding of the user's intention.

The above specific embodiments do not constitute limitations to the scope of protection of the present invention. Those skilled in the art should understand that, depending on design requirements and other factors, various modifications, combinations, sub-combinations and replacements may occur. Any modifications, equivalent substitutions, improvements and the like made within the spirit and principle of the present invention shall be included in the scope of protection of the present invention.

The invention claimed is:

1. A method for recognizing speech, comprising:
by one or more processors, respectively setting initial values of a Chinese character coefficient and a Pinyin coefficient, generating a Chinese character mapping function according to the initial value of the Chinese character coefficient, and generating a Pinyin mapping function according to the initial value of the Pinyin coefficient;

by the one or more processors, training the Chinese character mapping function and the Pinyin mapping function using a plurality of preset training samples, calculating training results as parameters of a joint loss function, and generating a target mapping function according to calculation results; and by the one or more processors, recognizing, according to the target mapping function, speech to be recognized, so as to obtain a Chinese character recognition result and a Pinyin recognition result of the speech to be recognized, wherein the training the Chinese character mapping function and the Pinyin mapping function using a plurality of preset training samples, calculating training results as parameters of a joint loss function, and generating a target mapping function according to calculation results comprise:

acquiring a Chinese character loss value and a Pinyin loss value of each training sample according to the Chinese character mapping function, the Pinyin mapping function and the plurality of preset training samples;

calculating the Chinese character loss value and the Pinyin loss value of each training sample as parameters of the joint loss function, so as to obtain a joint loss value of each training sample; and using a back-propagation algorithm for calculation according to the joint loss value of each training sample, to obtain target values of the Chinese character coefficient and the Pinyin coefficient, and generating a target mapping function according to the target values.

2. The method according to claim 1, wherein the training sample includes a frequency spectrum of sample speech, Chinese characters matching the sample speech, and Pinyins matching the sample speech; and the acquiring a Chinese character loss value and a Pinyin loss value of each training sample according to the Chinese character mapping function, the Pinyin mapping function and the plurality of preset training samples comprises:

respectively calculating, for each preset training sample, the frequency spectrum in the training sample as parameters of the Chinese character mapping function and the Pinyin mapping function, so as to obtain a Chinese character recognition result and a Pinyin recognition result of the training sample;

taking a difference between the Chinese character recognition result of the training sample and the Chinese characters in the training sample as a Chinese character loss value of the training sample; and taking a difference between the Pinyin recognition result of the training sample and the Pinyins in the training sample as a Pinyin loss value of the training sample.

3. The method according to claim 1, wherein the calculating the Chinese character loss value and the Pinyin loss value of each training sample as parameters of the joint loss function, so as to obtain a joint loss value of each training sample, comprises:

taking, for each training sample, a product of a preset Chinese character weight and the Chinese character loss value of the training sample as a first value;

taking a product of a preset Pinyin weight and the Pinyin loss value of the training sample as a second value, wherein a sum of the Chinese character weight and the Pinyin weight is 1;

taking a sum of a second norm of the initial value of the Chinese character coefficient and a second norm of the initial value of the Pinyin coefficient as a third value, and taking a product of the third value and a preset regular term coefficient as a fourth value; and taking a sum of the first value, the second value and the fourth value as a joint loss value of the training sample.

4. The method according to claim 1, wherein the recognizing, according to the target mapping function, speech to be recognized, so as to obtain a Chinese character recognition result and a Pinyin recognition result of the speech to be recognized, comprises:

performing a short-time Fourier transform on a time domain of the speech to be recognized, so as to obtain a frequency spectrum of the speech to be recognized; and calculating the frequency spectrum of the speech to be recognized as a parameter of the target mapping function, so as to obtain a Chinese character recognition result and a Pinyin recognition result of the speech to be recognized.

5. An electronic device, comprising:

one or more processors; and a storage device for storing one or more programs, which, when executed by the one or more processors, cause the one or more processors to implement the method comprising steps of:

respectively setting initial values of a Chinese character coefficient and a Pinyin coefficient, generating a Chinese character mapping function according to the initial value of the Chinese character coefficient, and generating a Pinyin mapping function according to the initial value of the Pinyin coefficient;

training the Chinese character mapping function and the Pinyin mapping function using a plurality of preset training samples, calculating training results as parameters of a joint loss function, and generating a target mapping function according to calculation results; and recognizing, according to the target mapping function, speech to be recognized, so as to obtain a Chinese character recognition result and a Pinyin recognition result of the speech to be recognized, wherein the training the Chinese character mapping function and the Pinyin mapping function using a plurality of preset training samples, calculating training results as parameters of a joint loss function, and generating a target mapping function according to calculation results comprise:

acquiring a Chinese character loss value and a Pinyin loss value of each training sample according to the Chinese character mapping function, the Pinyin mapping function and the plurality of preset training samples;

calculating the Chinese character loss value and the Pinyin loss value of each training sample as parameters of the joint loss function, so as to obtain a joint loss value of each training sample; and using a back-propagation algorithm for calculation according to the joint loss value of each training sample, to obtain target values of the Chinese character coefficient and the Pinyin coefficient, and generating a target mapping function according to the target values.

6. The electronic device according to claim 5, wherein the training sample includes a frequency spectrum of sample speech, Chinese characters matching the sample speech, and Pinyins matching the sample speech, and the acquiring a Chinese character loss value and a Pinyin loss value of each training sample according to the Chinese character mapping function, the Pinyin mapping function and the plurality of preset training samples comprises:
  respectively calculating, for each preset training sample, the frequency spectrum in the training sample as parameters of the Chinese character mapping function and the Pinyin mapping function, so as to obtain a Chinese character recognition result and a Pinyin recognition result of the training sample;
  taking a difference between the Chinese character recognition result of the training sample and the Chinese characters in the training sample as a Chinese character loss value of the training sample; and
  taking a difference between the Pinyin recognition result of the training sample and the Pinyins in the training sample as a Pinyin loss value of the training sample.

7. The electronic device according to claim 5, wherein the calculating the Chinese character loss value and the Pinyin loss value of each training sample as parameters of the joint loss function, so as to obtain a joint loss value of each training sample, comprises:
  taking, for each training sample, a product of a preset Chinese character weight and the Chinese character loss value of the training sample as a first value;
  taking a product of a preset Pinyin weight and the Pinyin loss value of the training sample as a second value, wherein a sum of the Chinese character weight and the Pinyin weight is 1;
  taking a sum of a second norm of the initial value of the Chinese character coefficient and a second norm of the initial value of the Pinyin coefficient as a third value, and taking a product of the third value and a preset regular term coefficient as a fourth value; and
  taking a sum of the first value, the second value and the fourth value as a joint loss value of the training sample.

8. The electronic device according to claim 5, wherein the recognizing, according to the target mapping function, speech to be recognized, so as to obtain a Chinese character recognition result and a Pinyin recognition result of the speech to be recognized, comprises:
  performing a short-time Fourier transform on a time domain of the speech to be recognized, so as to obtain a frequency spectrum of the speech to be recognized; and
  calculating the frequency spectrum of the speech to be recognized as a parameter of the target mapping function, so as to obtain a Chinese character recognition result and a Pinyin recognition result of the speech to be recognized.

9. A non-transitory computer-readable medium with a computer program stored thereon, which, when executed by a processor, implements a method for recognizing speech, comprising:
  by one or more processors, respectively setting initial values of a Chinese character coefficient and a Pinyin coefficient, generating a Chinese character mapping function according to the initial value of the Chinese character coefficient, and generating a Pinyin mapping function according to the initial value of the Pinyin coefficient;
  by the one or more processors, training the Chinese character mapping function and the Pinyin mapping function using a plurality of preset training samples, calculating training results as parameters of a joint loss function, and generating a target mapping function according to calculation results; and
  by the one or more processors, recognizing, according to the target mapping function, speech to be recognized, so as to obtain a Chinese character recognition result and a Pinyin recognition result of the speech to be recognized,
  wherein the training the Chinese character mapping function and the Pinyin mapping function using a plurality of preset training samples, calculating training results as parameters of a joint loss function, and generating a target mapping function according to calculation results comprise:
    acquiring a Chinese character loss value and a Pinyin loss value of each training sample according to the Chinese character mapping function, the Pinyin mapping function and the plurality of preset training samples;
    calculating the Chinese character loss value and the Pinyin loss value of each training sample as parameters of the joint loss function, so as to obtain a joint loss value of each training sample; and
  using a back-propagation algorithm for calculation according to the joint loss value of each training sample, to obtain target values of the Chinese character coefficient and the Pinyin coefficient, and generating a target mapping function according to the target values.

* * * * *